United States Patent [19]
Schmeichel

[11] Patent Number: 5,906,407
[45] Date of Patent: May 25, 1999

[54] TONNEAU COVER TENSION ADJUSTER APPARATUS

[76] Inventor: Charles Milton Schmeichel, P.O. Box 1395, Jamestown, N. Dak. 58402-1395

[21] Appl. No.: 09/122,874

[22] Filed: Jul. 27, 1998

[51] Int. Cl.$^6$ .................................................. B60P 7/04
[52] U.S. Cl. .............................. 296/100.15; 296/100.18
[58] Field of Search ......................... 296/100.15, 100.18

[56] References Cited

U.S. PATENT DOCUMENTS

| | | | |
|---|---|---|---|
| 4,144,660 | 3/1979 | Lamb | 38/102.5 |
| 4,730,866 | 3/1988 | Nett | 296/100 |
| 4,838,602 | 6/1989 | Nett | 296/100 |
| 4,923,240 | 5/1990 | Swanson | 296/100 |
| 5,058,652 | 10/1991 | Wheatley et al. | 160/327 |
| 5,076,338 | 12/1991 | Schmeichel et al. | 296/100.15 |
| 5,113,611 | 5/1992 | Rosson | 38/102.7 |
| 5,152,574 | 10/1992 | Tucker | 296/100.18 |
| 5,251,951 | 10/1993 | Wheatley | 296/100.15 |
| 5,511,843 | 4/1996 | Isler et al. | 296/100 |
| 5,522,635 | 6/1996 | Downey | 296/100 |
| 5,526,866 | 6/1996 | Flentge | 160/380 |
| 5,540,475 | 7/1996 | Kersting et al. | 296/100 |
| 5,595,417 | 1/1997 | Thoman et al. | 296/100 |
| 5,636,893 | 6/1997 | Wheatley et al. | 296/100 |
| 5,653,491 | 8/1997 | Steffens et al. | 296/100 |
| 5,688,017 | 11/1997 | Bennett | 296/100 |

*Primary Examiner*—Gary C. Hoge
*Attorney, Agent, or Firm*—Curtis V. Harr

[57] ABSTRACT

A tonneau cover is provided that is attached at its most forward end to an adjustable tensioning rail which spans the front end of a pickup truck box. The tensioning rail is adjustably attached at its outside edges to two side rails which are attached to the inside of a pickup box. The adjustable attachment of the tensioning rail to the side rails is accomplished by the use of a tensioning screw and two attachment blocks. As the tensioning screw is moved forwards and backwards by the use of the adjustment knob, the tensioning rail is moved in a corresponding manner. This adjustment is preformed when the tonneau cover is in the open position, and thus, allows a user to obtain the desired amount if tightness when the tonneau cover is subsequently placed in the closed position.

14 Claims, 5 Drawing Sheets

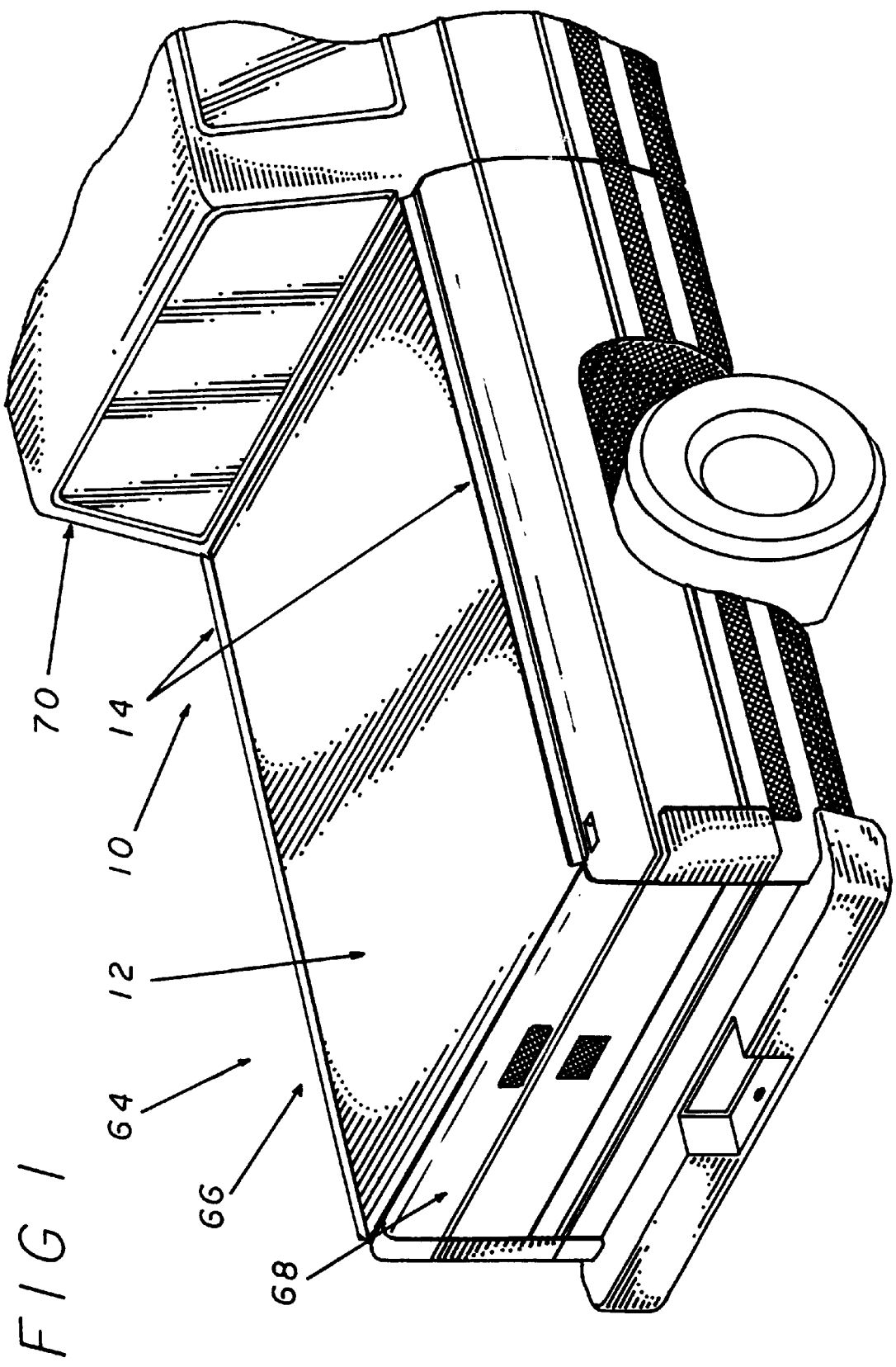

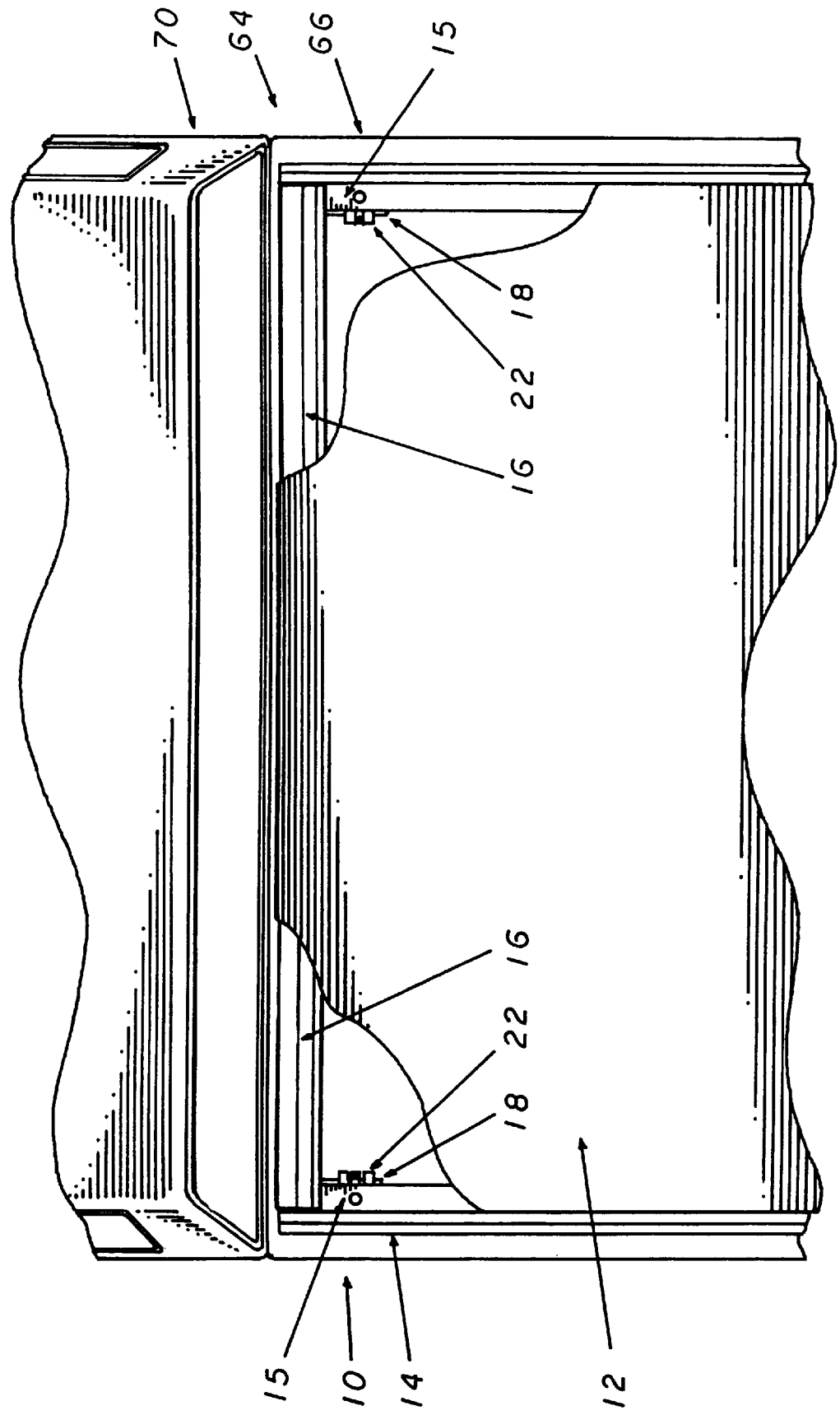

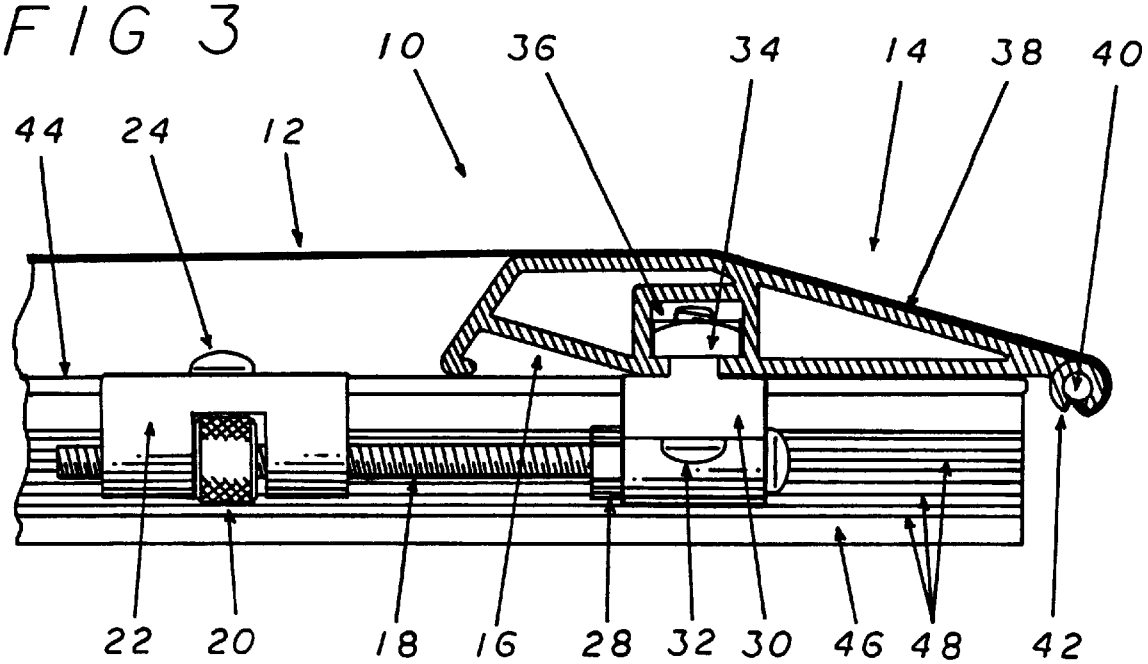
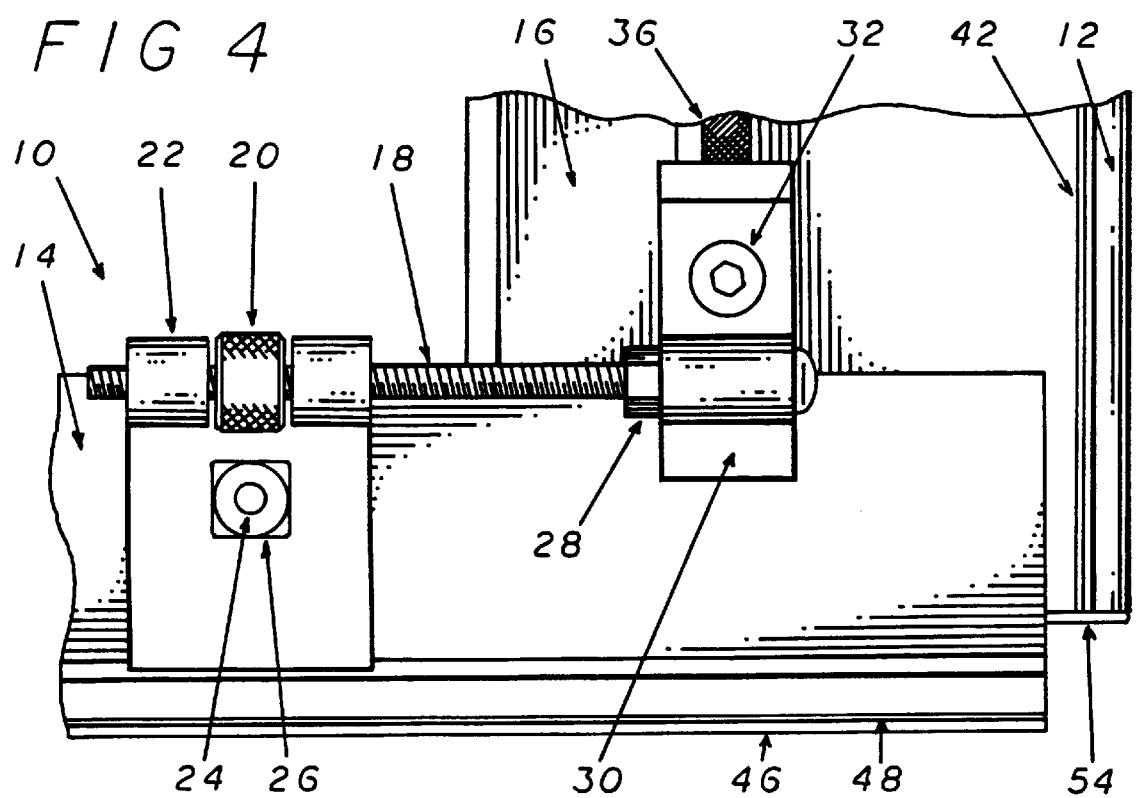

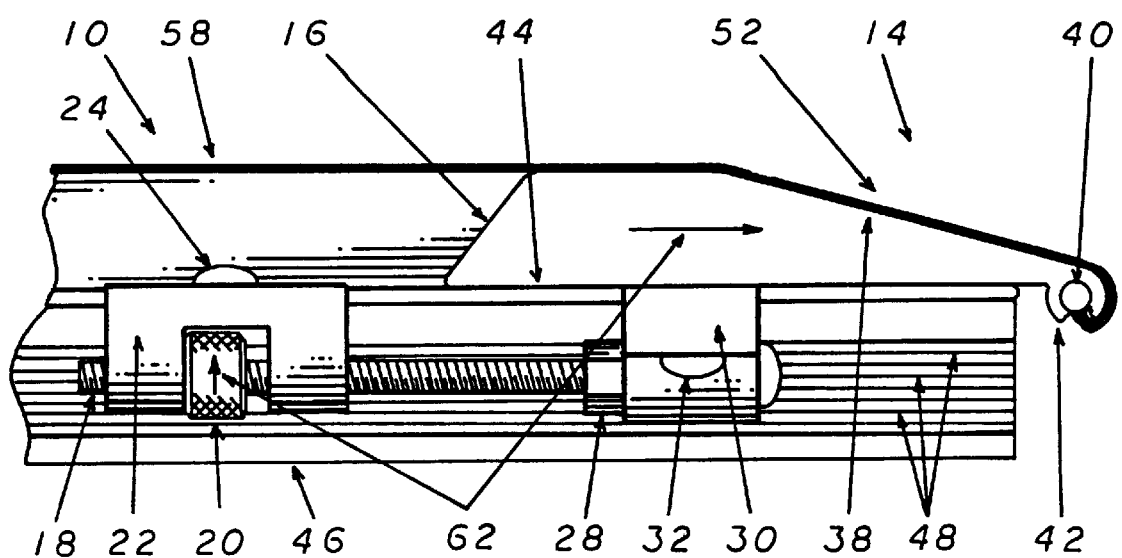

TONNEAU COVER TENSION ADJUSTER APPARATUS

BACKGROUND OF THE INVENTION

The present invention relates to an improvement in the manner in which a tonneau cover is attached to a pickup truck box. More specifically, a method of attachment which allows for the adjustment of the tonneau cover in order to provide the user with a means by which the tension placed upon the tonneau cover can be varied to provide a tight seal in varying conditions and as the cover ages or stretches.

In the past, tonneau covers have been used to cover box openings of pickup trucks to protect the contents from wind, rain and snow, or simply for cosmetic reasons. The types of tonneau covers and methods of fastening the covers have varied greatly over the years. In recent years, one type of cover that has been commonly used is a tonneau cover that attaches at one end, typically the front end nearest the cab of the vehicle, in a permanent fashion. The sides and tailgate area are fastened to box of the pickup when closed. In the open position, the cover may be rolled forward toward the cab of the pickup and the attached end of the tonneau cover.

The problem with this type of arrangement is that tonneau covers may stretch over time. This can be greatly affected by the weather and use or stress placed upon the tarp. As the tarp sags, it may begin to look aesthetically poor and cause problems such as puddling of water. This can be especially dangerous when the puddles freeze, resulting in chunks or sheets of ice that fly off during travel and create hazards for other drivers on the road. A second problem caused by sagging tonneau covers is wind flap. This occurs during travel of the vehicle when the tonneau cover flaps in the wind causing noise and creating undue wear and greater stretching of the cover.

In order to deal with this problem, tonneau cover makers have developed ways of adjusting the position of the front portion of tonneau cover. Typically, the front portion may be bolted on rail or brace system with clamps and thus, the bolts may be loosened and moved on the rail to adjust the position of the front portion of the cover, in turn affecting the tension of the cover when in the attached position. This type of system requires the use of tools and trial and error to get the correct tension on the tonneau cover. It may also be very difficult to adjust each side accurately and evenly with the other. Due to the difficulty in making these adjustments many tonneau cover owners ignore the problem of improperly adjusting the cover after installation and thus, creating undue stress and wear on the cover as well as posing a potentially dangerous condition for others on the road.

From this discussion it can be seen that it would be desirable to create a means of easily adjusting the tension and position of tonneau covers used on pickups today. It can also be seen that it would be advantageous to make this adjustment as easy as possible to make and to insure that users keep their covers in taught arrangement to prevent the problems listed above and to keep the tonneau cover as aesthetically pleasing as possible.

SUMMARY OF THE INVENTION

It is the primary objective of the present invention to provide a method of tightening tonneau covers that are commonly used to protect the contents of pickup truck boxes from wind, rain and snow.

It is an additional objective of the present invention to provide such a method that allows for the adjustment of the tightening apparatus in order to compensate for varying conditions or wear on the tonneau cover.

It is still a further objective of the present invention to provide a such a method that can be employed in an inexpensive and effective manner.

These objectives are accomplished by the use of a tonneau cover that is attached at its most forward end to an adjustable tensioning rail which spans the front end of a pickup truck box. The attachment of the tonneau cover is accomplished by the use of small diameter rope, rod or the like, that is sewn into a loop along the entire forward edge of the cover. The rope and tonneau cover loop are then slid into a receptor channel located along the front lower edge of the tensioning rail which securely holds the leading edge of the tonneau cover in place. This design allows the amount of tension placed on the tonneau cover to be varied by adjusting the location of the tensioning rail, thereby, allowing the user to obtain the desired degree of tension on the installed tonneau cover, when latched.

The tensioning rail is adjustably attached at its outside edges to two side rails which are attached to the inside of a pickup box by the use of a plurality of C-type clamps bolts or the like. The adjustable attachment of the tensioning rail to the side rails is accomplished by the use a tensioning screw and two attachment blocks. The side rails have fixedly mounted blocks through which one end of the tensioning screws pass. The portion of the block through which the screw passes is interrupted at its center by an open space which houses the screw adjustment knob which is in turn threaded over the tensioning screw. Therefore, as the adjustment knob is rotated, the tensioning screw will travel either forwards or backwards within the attachment block because the lateral travel of the adjustment knob is limited by the two sides of the attachment block.

The attachment of the tensioning rail to the tensioning screw is accomplished by using another fixedly mounted block that extends downward from the lower surface of the tensioning rail, just inside of where the tensioning rail sits on the side rail. The tensioning screw again passes through this block but is fixedly mounted to the block by a stop nut that is threaded down the length of the screw until it contacts the block, where it is tightened to hold the screw in place. Therefore, as the tensioning screw is moved forward and backward, with the cover in the open position by the use of the adjustment knob, the tensioning rail is moved in a corresponding manner which serves to adjust the tension placed upon the tonneau cover when subsequently placed in the closed and latched position.

For a better understanding of the present invention reference should be made to the drawings and the description in which there are illustrated and described preferred embodiments of the present invention.

DESCRIPTION OF THE DRAWINGS

FIG. 1 is a perspective view of the present invention showing the orientation of the invention when it is fitted to the box of a typical pickup box.

FIG. 2 is a top elevation view cut-away of the present invention showing the orientation of the tonneau cover and the location and method of construction of the tensioning rail apparatus.

FIG. 3 is a side elevation cut away view of the present invention showing the manner in which the tensioning screw is attached to and controls the positioning of the tensioning rail and the tonneau cover.

FIG. 4 is a bottom elevation cut-away view of the present invention again showing the manner in which the tensioning screw is attached to and controls the positioning of the tensioning rail and the tonneau cover.

FIG. 7 is a side elevation cut-away view of the present invention showing the tensioning screw fully engaged, or with tension on the tonneau cover.

DESCRIPTION OF THE PREFERRED EMBODIMENT

Figure 5:
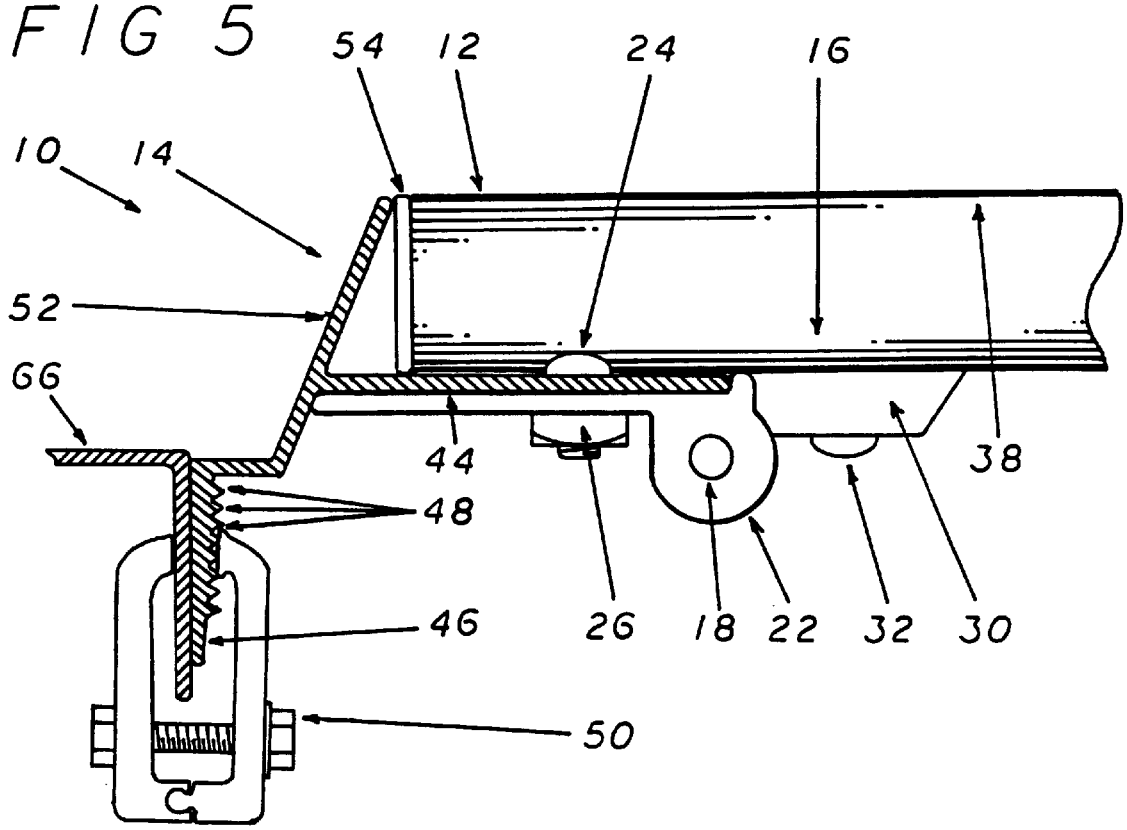
FIG. 5 is a front elevation cut-away view of the present invention detailing the manner in which the side rails are attached to the pickup box and the orientation of its major components in relation to the side rails.

Referring now to the drawings, and more specifically to FIGS. 1 and 2, the tonneau cover tension adjuster apparatus 10 is made up of a tonneau cover 12 which fits over and covers the opening of a pickup truck box 66 of a typical pickup truck 64. The tonneau cover 12 extends from just behind the pickup cab 70 back to the tail gate 68 located at the most rearward portion of the truck box 66. This is accomplished by the use of a pair of apparatus side rails 14 which are attached to and run down the entire length of the upper outside edges of the truck box 66. The side rails 14 form the outside frame of the tonneau cover 12 and are the base upon which the cover tensioning rail 16 is attached. The side rails 14 also contain at their forward ends, a pair of graduated measuring scales 15 which give the user a point of reference to ensure that each side of the tensioning rail 16 places the same degree of tension on the tonneau cover 12.

The tensioning rail 16 provides the forward attachment point for the front edge of the tonneau cover 12 and is mounted to the side rails 14 in a manner that allows it to slide forward and rearward to provide the tonneau cover 12 with the motion necessary to either be stretched tightly over the truck box 66 or to be loosened. The attachment and sliding motion of the tensioning rail 16 are both provided by the tensioning screw 18 and the adjustment block 22 located on the most forward underneath end of the side rails 14. Thus, a user can vary the lateral tension placed on the tonneau cover 12 to ensure that it provides a tight seal in all conditions between the interior of the pickup box 66 and the outside elements even in high wind conditions, such as highway driving.

The construction of the mounting and adjustment portion of the tensioning rail 16 of the present invention are detailed in FIGS. 3 and 4. The tensioning rail 16 is perpendicularly mounted between the two side rails 14 at their most forward ends by the use of the adjustment block 22, the tensioning screw 20 and the tensioning rail attachment block 30. The adjustment block 22 is attached to the lower surface of the side rail component mount surface 44 which is the flat laterally extending portion of the side rails 14. This attachment is accomplished by passing the adjustment block attachment bolt 24 downward through both the component mount surface 44 and the adjustment block 22 where it is secured by the attachment nut 26 located on the underneath surface of the adjustment block 22.

The most outward portion of the adjustment block 22 forms two, side by side cylindrical members through the center of which the tensioning screw 18 is passed. In between these two members lies the screw adjustment knob 20. The screw adjustment knob 20 is threaded onto the tensioning screw 18. Its lateral travel is limited by the cylindrical members of the adjustment block 22. Therefore, when the screw adjustment knob 20 is rotated, the tensioning screw 18 moves either forward or rearward, depending upon the direction of rotation of the tensioning screw 18, which controls the orientation of the tensioning rail 16 in relation to the side rails 14.

From the adjustment block 22, the tensioning screw 18 extends forward to where it passes though the tensioning rail attachment block 30. At its most forward end, the tensioning screw's 18 lateral travel is limited by the screw head, which rests against the outside forward edge of the rail block 30. The most forward portion of the tensioning screw 18 is then held in a locked position within the tensioning rail attachment block 30 by the use of the tensioning screw stop nut 28. The tensioning screw lock nut 28 is threaded down the length of the tensioning screw 18 until it comes in contact with the rearward surface of the rail block 30. At this point, it is tightened into place so as to hold the tensioning screw 18 securely within the rail block 30. In another embodiment (not shown) the tensioning screw stop nut 28 may be eliminated by molding the tensioning screw 18 and screw head directly into the rail back 30. Thus, the tensioning screw 18 and the rail block 30 would be one piece. In both embodiments, when the tensioning screw 18 is moved forward or rearward by the use of the screw adjustment knob 20, the rail block 30 is moved accordingly.

The tensioning rail attachment block 30 is held in place on the lower surface of the tensioning rail 16 by extending the rail block attachment bolt 32 upwards through the rail block 30. The attachment bolt 32 extends beyond the upper surface of the rail block 30 to where it passes when the rail block 30 is placed against the lower surface of the tensioning rail 16, into the tensioning rail attachment chamber 36. The rail attachment chamber is an opening within the tensioning rail 16 which has a narrow downward facing opening through which the attachment bolt 32 passes. The interior of the attachment chamber 36 is therefore larger than the opening for the attachment bolt 32 which creates a flat surface on either side of the passage upon which the rail block attachment nut 34 rests. Thus, when the attachment nut 34 is placed within the attachment chamber 36, the attachment bolt 32 is threaded and tightened into the attachment nut 34 which serves to hold the tensioning rail block 30 against the bottom surface of the tensioning rail 16. This construction method serves both to secure the tensioning rail 16 to the side rails 14, and to provide a means by which the tensioning rail 16 can be adjusted to vary the tension placed on the tonneau cover 12, when latched.

The tonneau cover 12 is attached to the tensioning rail 16 by use of the tonneau cover attaching rope 40. The attaching rope 40 is a length of small diameter rope that is sewn into a loop at the most forward edge of the tonneau cover 12. The attaching rope 40 and the loop are inserted into the attaching rope channel 42 located on the lower most forward surface of the tensioning rail 16. The tonneau cover 12 extends rearward from this point over the upper tensioning rail surface 38 and continues back to cover the pickup truck box 66 where it is anchored at a location above the tailgate 68. This connection allows the adjustable tensioning rail 16 to vary the position of tonneau cover 12 in order to provide a tight seal over the truck box 66.

The construction of the side rails 14 is illustrated in FIG. 5. The side rails 14 are generally L-shaped components having the short portion of the "L" forming a vertical surface extending downward from the most outside edge of the side rail 14. This vertical portion is the side rail to truck clamp surface 46 and has on its inner surface a series of ridges called clamp cleats 48. The truck clamp surface 46 provides the point of attachment for securing the side rails 14, and the present invention, to the upper and inner surface of the truck box 66. This attachment is accomplished by the use of a plurality of attachment clamps 50, which are generally C-shaped clamping devices, with one portion of the opened end of the "C" engaging the inner surface of the truck box 66 and the other engaging the clamp cleats 48 on the truck clamp surface 46 of the side rails 14. The clamp cleats 48 provide a roughened surface for the attachment clamp 50 to engage ensuring a secure attachment of the present invention and the tonneau cover 12 to the pickup truck box 66.

The longer portion of the L-shape of the side rails 14 forms the side rail component mount surfaces 44 to which the mounting apparatus for the tensioning rail 16 and the tensioning screw 18 are attached. Additionally, each of the side rails 14 also have an upwardly oriented diagonal surface 52 which serves as both the outward cosmetic edge of the side rails 14 and as guides or frames within which the tonneau cover 12 is stretched. Additionally, the tensioning rail 16 is also equipped with two tensioning rail end caps 54 which fit over each end of the tensioning rail 16 just inside of the side rail diagonal surface.

Figure 6:
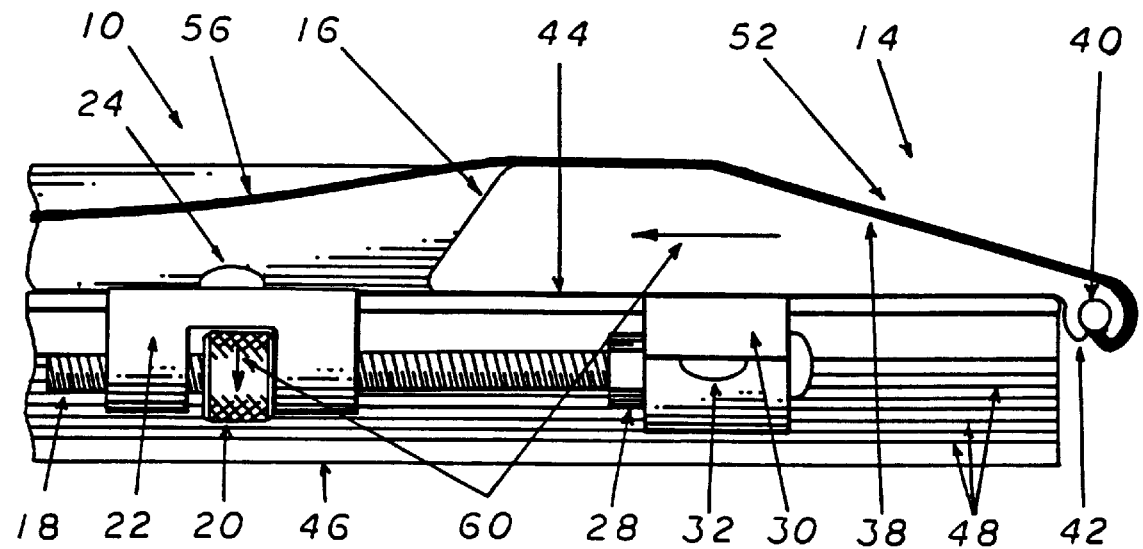
FIG. 6 is a side elevation cut-away view of the present invention showing the tensioning screw when the tonneau cover is in an unlocked state with no tension.

The method of operation of the tonneau cover tension adjuster apparatus 10 is further illustrated in FIGS. 6 and 7. To reduce the tension or loosen the tonneau cover 56 for either its removal or installation, the user rotates the screw adjustment knob 20 in a clockwise manner which serves to pull the tensioning rail 16 back through the tensioning screw 18 and the tensioning rail attachment block 30 (the loosening movement accomplished by this operation is illustrated by the directional arrows labeled as 60). Conversely, to obtain a tensioned or taught tonneau cover 58, when latched one simply reverses this process by rotating the screw adjustment knob 20 in a counter-clockwise manner which serves to force the tensioning rail 16 forward through the tensioning screw 18 and tensioning rail attachment block 30 (the tensioning movement accomplished by this operation is illustrated by the directional arrows labeled as 62).

Although the present invention has been described in considerable detail with reference to certain preferred versions thereof, other versions are possible. Therefore, the spirit and scope of the appended claims should not be limited to the description of the preferred versions contained herein.

What is claimed is:

1. An adjustable assembly for a cargo box cover for use on a cargo box having upwardly extending left and right side walls, a front wall and a rear end gate wall, said walls defining the boundaries of the cargo box, the cargo box cover having a left and right rail connected to said left and right side wall, an elongate tensioning rail having a left and right end said tensioning rail extending from said left rail to said right rail and further having a cover fixedly attached along said tensioning rail, said adjustable assembly comprising:

a left and right block means connected to said left and right rail;

a left and right attachment block means connected to said left and right end of said tensioning rail; and an adjustable connection means for connecting said tensioning rail to said left and right rail.

2. An adjustable assembly as in claim 1 wherein each of said left and right block means connected to said left and right rail comprises a front and rear block section connected to a base block section so as to define a space between said front and rear block section, said front and rear block sections further defining a hole in an aligned orientation so as to pass through said front and rear block section across said space between said front and rear block sections.

3. An adjustable assembly as in claim 2 wherein each of said left and right attachment block means comprises an attachment block section having an elongate treaded tension screw fixedly attached to said attachment block section and extending through said front and rear block sections spanning said space between said front and rear block section.

4. An adjustable assembly as in claim 3 further comprising a screw adjustment knob between said front and rear block section defining an inner threaded hole for receiving said threaded tension screw.

5. An adjustable assembly as in claim 4 further comprising a graduated measuring scale on said left and right rail so as to accurately adjust said left and right side of said tensioning rail in respect to said left and right rail.

6. An adjustable assembly as in claim 5 wherein said hole defined by said front and rear block sections is of a larger diameter than said threaded tension screw.

7. An adjustable assembly as in claim 1 wherein said left and right block means is fixedly connected to said left and right end of said tensioning rail and said left and right attachment block means is fixedly connected to said left and right rail.

8. An adjustable cover for a cargo box that comprises upwardly extending left and right side walls, a front wall and a rear end gate wall said walls defining the boundaries of the cargo box, the adjustable cover assembly comprising:

a left and right rail connected to said left and right side wall;

an elongate tensioning rail having a left and right end said tensioning rail extending from said left rail to said right rail;

a left and right block means connected to said left and right rail;

a left and right attachment block means connected to said left and right end of said tensioning rail; and an adjustable connection means for connecting said tensioning rail to said left and right rail.

9. An adjustable cover for a cargo box as in claim 8 wherein each of said left and right block means connected to said left and right rail comprises a front and rear block section connected to a base block section so as to define a space between said front and rear block section, said front and rear block sections further defining a hole in an aligned orientation so as to pass through said front and rear block section across said space between said front and rear block sections.

10. An adjustable cover for a cargo box as in claim 9 wherein each of said left and right attachment block means comprises an attachment block section having an elongate treaded tension screw fixedly attached to said attachment block section and extending through said front and rear block sections spanning said space between said front and rear block section.

11. An adjustable cover for a cargo box as in claim 10 further comprising a screw adjustment knob between said front and rear block section defining an inner threaded hole for receiving said threaded tension screw.

12. An adjustable cover for a cargo box as in claim 11 further comprising a graduated measuring scale on said left and right rail so as to accurately adjust said left and right side of said tensioning rail in respect to said left and right rail.

13. An adjustable cover for a cargo box as in claim 12 wherein said hole defined by said front and rear block sections is of a larger diameter than said threaded tension screw.

14. An adjustable cover for a cargo box as in claim 8 wherein said left and right block means is fixedly connected to said left and right end of said tensioning rail, and said left and right attachment block means is fixedly connected to said left and right rail.

* * * * *